Reissued Oct. 3, 1950 Re. 23,276

UNITED STATES PATENT OFFICE 23,276

CHEMICAL INDICATOR

Harry Fleisher, Greenbelt, Md.

No Drawing. Original No. 2,416,619, dated February 25, 1947, Serial No. 549,251, August 12, 1944. Application for reissue April 11, 1949, Serial No. 86,854

6 Claims. (Cl. 252—408)

(Granted under the act of March 3, 1883, as amended April 30, 1928; 370 O. G. 757)

Matter enclosed in heavy brackets [ ] appears in the original patent but forms no part of this reissue specification; matter printed in italics indicates the additions made by reissue

This invention relates to the provision of chemical indicators which, by virtue of inherent color changes, provide a means for visually identifying the equivalence point of a neutralization reaction. The invention finds particular utility in titrimetric analysis for determining the alkalinity of water, especially boiler feed water, and other solutions.

The indicator used in alkalinity analysis should show a sharp color change at the equivalence point, i. e., the point at which the neutralization reaction is complete, with no excess of either acid or alkali. For water analysis, this true stoichiometric end-point has been determined to lie between a pH of about 4.6 and 4.9, depending on solution concentration and temperature.

Heretofore, practically all volumetric tests for determining the alkalinity of solutions, and particularly of waters, were conducted with the aid of methyl orange as the indicator. However, the maximum color transition of methyl orange occurs at pH values ranging from about 3.8 to 4.3, which makes the indicator difficult to use in detecting an end-point lying in the pH range 4.6 to 4.9, even in the hands of an experienced operator. For this reason, numerous attempts have been made by various investigators to develop indicators which would be suitable for use in place of methyl orange. These attempts have thus far failed because the indicators developed therefrom were subject to one or more handicaps or limitations, including little or no improvement over the methyl orange color change; failure to accurately identify the true equivalence point of the neutralization reaction; lack of solution stability, often due to the alcoholic vehicle used; complexity of composition resulting in increased cost; and limited applicability because of incompatibility with contaminating elements.

It is accordingly an object of the present invention to provide a stable and economical indicator capable of wide application by virtue of its resistance to interference from contaminating elements. Another object is to provide an indicator which possesses a color transition of such distinct contrast as to make the end-point unmistakably distinguishable. A further object is to provide an indicator which possesses a color transition end-point practically coincident with the equivalence point encountered in water alkalinity analysis.

The above objectives are accomplished according to the present invention by the use of solutions of the sodium salt of dimethylaminoazobenzene-o-carboxylic acid to which are added various coloring agents in proper ratio to insure maximum accuracy and sensitivity. The sodium salt of dimethylaminoazobenzene-o-carboxylic acid is in itself a water soluble acid-base indicator, showing color transitions of yellow to red in passing from the alkaline to the acid state. However, this change is rather difficult to detect and furthermore occurs at a pH value not within the limits previously established for the neutralization reaction, i. e., 4.6 to 4.9. I have discovered that achromatic effects induced by the combination of dissimilar colors make the indicator color transition more readily detectable, and further, cause the said transition to occur within the pH range 4.6 to 4.9. For example, the color produced by a blue dye supplements the colors produced by the indicator during its transition to give complementary shades of green to violet, which display a distinct contrast at the end-point of the reaction. In this case the violet color appears abruptly with the reaching of the equivalence point involved in the neutralization reaction employed in water alkalinity analysis. This is usually a pH of about 4.89 for boiler feed waters, though, as stated above, the pH at the equivalence point may range from about 4.6 to 4.9 for most water alkalinity analyses.

The following specific examples will further illustrate the invention. It is understood that the invention is not limited thereto since variations and substitutions of dyestuffs or coloring agents, and of quantities of indicator and dyestuff, are possible within the spirit of the invention. The various colour index numbers given below and in the appended claims refer to color compounds bearing such numbers as described in "Colour Index," (1924), Society of Dyers and Colourists, Yorkshire, England.

Example I 0.45 gram of sodium salt of dimethylaminoazobenzene-o-carboxylic acid is dissolved in about 300 cc. of distilled water. To this solution is added 0.55 gram of a blue dyestuff (Colour Index No. 714), and the mixture stirred to effect solution of the dye. Sufficient distilled water is then added to the solution to make a total volume of 1000 cc.

Example II 0.55 gram of sodium salt of dimethylaminoazobenzene-o-carboxylic acid is dissolved in about 300 cc. of distilled water. To this solution is added 0.50 gram of a blue dyestuff (Colour Index No. 707), and the mixture stirred to effect solution of the dye. Sufficient distilled water is then added to the solution to make a total volume of 1000 cc.

Example III 0.50 gram of sodium salt of dimethylaminoazobenzene-o-carboxylic acid is dissolved in about 300 cc. of distilled water. To this solution is added 0.40 gram of a blue dystuff (Colour Index No. 833), and the mixture stirred to effect solution of the dye. Sufficient distilled water is then added to the solution to make a total volume of 1000 cc.

Example IV 0.45 gram of sodium salt of dimethylaminoazobenzene-o-carboxylic acid is dissolved in about 300 cc. of distilled water. To this solution is added 0.65 gram of a blue dyestuff (Colour Index No. 518), and the mixture stirred to effect solution of the dye. Sufficient distilled water is then added to the solution to make a total volume of 1000 cc.

In applying the indicator solutions to the determination of water alkalinity, the usual practice is to add three drops of the indicator to each 100 cc. of water being tested. Titrations are usually conducted at room temperatures (70–80° F.), although accuracy of the titration is not materially affected by the usual variations from room temperature. In alkaline solutions, the color produced by the indicator solutions is green. As the titration progresses the green color disappears and the solution becomes either light-gray or colorless. This change provides the operator with adequate warning of the approaching end-point. Upon the completion of the neutralization, the indicator imparts a violet hue to the liquid, which color is taken as the end-point for the titration.

Laboratory check tests have ascertained that this end-point distinctly identifies the equivalence point for the neutralization reaction involved in water alkalinity analysis with a high degree of accuracy. The effect of interfering elements such as phosphates, neutral salts and organic matter on indicator accuracy has also been checked and found to be negligible. Service tests have proven the solutions to be stable for periods greater than one year. However, in the light of this information, it is not unreasonable to believe that the solutions possess indefinite stability under normal conditions.

The invention described herein may be manufactured and used by or for the Government of the United States of America for governmental purposes without the payment of any royalties thereon or therefor.

Within the scope of the appended claims, various modifications and changes in the nature and proportions of the ingredients may be made by those skilled in the art without departing from the nature of the invention.

I claim:

[1. An indicator, characterized by the ability to indicate the end point of a neutralizing reaction in the determination of the alkalinity in water, consisting of a mixture of the sodium salt of dimethylaminoazobenzene-o-carboxylic acid and a water soluble blue dyestuff, the ratio of the dyestuff to the sodium salt in said mixture being such as to indicate the said end point at a pH range of 4.6 to 4.9.]

[2. An indicator, characterized by the ability to indicate the end point of a neutralizing reaction in the determination of the alkalinity in water consisting of a mixture of the sodium salt of dimethylaminoazobenzene-o-carboxylic acid and a water soluble dyestuff bearing Color Index Number 518, the ratio of the dyestuff to the sodium salt in said mixture being such as to indicate the said end point of a pH range of 4.6 to 4.9.]

[3. An indicator, characterized by the ability to indicate the end point of a neutralizing reaction in the determination of the alkalinity in water consisting of a mixture of the sodium salt of dimethylaminoazobenzene-o-carboxylic acid and a water soluble dyestuff bearing Color Index Number 707, the ratio of the dyestuff to the sodium salt in said mixture being such as to indicate the said end point at a pH range of 4.6 to 4.9.]

[4. An indicator, characterized by the ability to indicate the end point of a neutralizing reaction in the determination of the alkalinity in water consisting of a mixture of the sodium salt of dimethylaminoazobenzene-o-carboxylic acid and a water soluble dyestuff bearing Color Index Number 714, the ratio of the dyestuff to the sodium salt in said mixture being such as to indicate the said end point at a pH range of 4.6 to 4.9.]

*5. An indicator, characterized by the ability to indicate the equivalence point of a neutralizing reaction in the determination of the alkalinity in water, consisting of a mixture of the sodium salt of dimethylaminoazobenzene-o-carboxylic acid and a water soluble blue dyestuff, the ratio of the dyestuff to the sodium salt in said mixture being such as to indicate substantially the equivalence point by the passage of the color of the mixture through a predeterminedly-arranged sequence of at least three distinct and contrasting color phases, one of which has a colorless or grayish hue and occurs immediately before the equivalence point and the last of which has a violet hue and begins substantially at the equivalence point.*

*6. An indicator, characterized by the ability to indicate the equivalence point of a neutralizing reaction in the determination of the alkalinity in water, consisting of a mixture of the sodium salt of dimethylaminoazobenzene-o-carboxylic acid and a water soluble dyestuff bearing Colour Index Number 518, the ratio of the dyestuff to the sodium salt in said mixture being such as to indicate substantially the equivalence point by the passage of the color of the mixture through a predeterminedly-arranged sequence of at least three distinct and contrasting color phases of green, light gray or colorless, and violet, two of which begin before the equivalence point and one of which begins substantially at the equivalence point.*

*7. An indicator, characterized by the ability to indicate the equivalence point of a neutralizing reaction in the determination of the alkalinity in water, consisting of a mixture of the sodium salt of dimethylaminoazobenzene-o-carboxylic acid and a water soluble dyestuff bearing Colour Index Number 714, the ratio of the dyestuff to the sodium salt in said mixture being such as to indicate substantially the equivalence point by the passage of the color of the mixture through a predeterminedly-arranged sequence of at least three distinct and contrasting color phases of green, light gray or colorless, and violet, two of which begin before the equivalence point and one of which begins substantially at the equivalence point.*

*8. An indicator, characterized by the ability to indicate the equivalence point of a neutralizing reaction in the determination of the alkalinity in water, consisting of a mixture of the sodium salt of dimethylaminoazobenzene-o-carboxylic acid*

*and a water soluble dyestuff bearing Colour Index Number 707, the ratio of the dyestuff to the sodium salt in said mixture being such as to indicate substantially the equivalence point by the passage of the color of the mixture through a predeterminedly-arranged sequence of at least three distinct and contrasting color phases of green, light gray or colorless, and violet, two of which begin before the equivalence point and one of which begins substantially at the equivalence point.*

*9. An indicator, characterized by the ability to indicate the equivalence point of a neutralizing reaction in the determination of the alkalinity in water, consisting of a mixture of the sodium salt of dimethylaminoazobenzene-o-carboxylic acid and a water soluble blue dyestuff, the ratio of the dyestuff to the sodium salt in said mixture being such whereby the color of the mixture during the neutralizing reaction passes sequentially through a greenish hue, a grayish hue or colorless, to a violet hue, the final color beginning substantially with the equivalence point.*

*10. An indicator, characterized by the ability to indicate the equivalence point of a neutralizing reaction in boiler water or boiler feed water, consisting of a mixture of the sodium salt of dimethylaminoazobenzene-o-carboxylic acid, a water soluble blue dyestuff and distilled water in substantially the relative proportions of 0.45 to 0.55 gram of sodium salt, 0.40 to 0.65 gram of blue dyestuff and the remainder of distilled water to complete 1000 c. c. of the mixture whereby the same during the neutralizing reaction in the boiler water or boiler feed water passes through a predeterminedly-arranged sequence of at least three distinct, readily recognizable, and contrasting color phases, at least two of which begin before the equivalence point and one of which begins substantially coincidental with the equivalence point.*

HARRY FLEISHER.

REFERENCES CITED

The following references are of record in the file of this patent or the original patent:

Johnson et al.—Ind. Eng. Chem., Anal ed., vol. II, pp. 2–4 (1930), abstracted in Chem. Abtsracts, vol. 24 (1930), p 1052.

Kocsis—Acta Lit. Sci. Regiae Univ. Hung. Francisco, vol. 4, pp. 236–8, abstracted in Chem. Abstracts, vol. 30 (1936), p. 7059.